(12) United States Patent
Takano et al.

(10) Patent No.: US 6,423,153 B2
(45) Date of Patent: Jul. 23, 2002

(54) METHOD OF AND APPARATUS FOR REMOVING OIL FROM A WASTE OBJECT

(75) Inventors: Hiroshi Takano, Kouka-gun; Tetsushi Yonekawa, Otsu, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/865,619

(22) Filed: May 29, 2001

Related U.S. Application Data

(62) Division of application No. 09/584,079, filed on Jun. 1, 2000, now Pat. No. 6,279,586, which is a division of application No. 09/311,281, filed on May 14, 1999, now Pat. No. 6,209,554.

(30) Foreign Application Priority Data

Jul. 30, 1998 (JP) ............................. 10-215209

(51) Int. Cl.$^7$ ................................. B08B 9/00
(52) U.S. Cl. ..................... 134/10; 134/22.1; 134/19; 134/166 R
(58) Field of Search ............ 134/10, 19, 22.1, 134/166 R, 105

(56) References Cited

U.S. PATENT DOCUMENTS

| | | | |
|---|---|---|---|
| 1,891,592 A | * | 12/1932 | Gerald |
| 2,912,990 A | | 11/1959 | Wilson |
| 3,637,522 A | * | 1/1972 | Young |
| 3,797,507 A | | 3/1974 | Jackson |
| 4,071,433 A | * | 1/1978 | Hanson |
| 4,141,373 A | * | 2/1979 | Kartanson et al. |
| 4,168,224 A | | 9/1979 | Jansma |
| 4,201,674 A | | 5/1980 | Schwinghammer |
| 4,592,786 A | * | 6/1986 | Williams et al. |
| 5,053,145 A | * | 10/1991 | Ellison |
| 5,178,754 A | * | 1/1993 | Batten et al. |
| 5,232,513 A | | 8/1993 | Suratt et al. |
| 5,423,340 A | | 6/1995 | Campbell et al. |
| 5,452,696 A | | 9/1995 | Flynn |
| 5,462,679 A | | 10/1995 | Verdegan et al. |
| 5,524,356 A | | 6/1996 | Lutz |
| 5,529,702 A | | 6/1996 | Segrave et al. |
| 5,540,784 A | | 7/1996 | Ranes |
| 5,542,442 A | * | 8/1996 | Gorman |
| 5,544,669 A | | 8/1996 | Manabe et al. |
| 5,851,386 A | | 12/1998 | Paul |
| 6,000,412 A | | 12/1999 | Chan et al. |

FOREIGN PATENT DOCUMENTS

EP          0794020          9/1997

* cited by examiner

Primary Examiner—Frankie L. Stinson
(74) Attorney, Agent, or Firm—Wenderoth, Lind & Ponack, L.L.P.

(57) ABSTRACT

A waste object containing oil has a first opening formed therein at an upper portion thereof and a second opening positioned below the first opening. The first and second openings are connected to a recovery tank. Hot water of a predetermined temperature is held in the recovery tank and is caused to accumulate inside the waste object via the second opening. Oil that has floated upwards is recovered in the recovery tank via the first opening.

4 Claims, 9 Drawing Sheets

METHOD OF AND APPARATUS FOR REMOVING OIL FROM A WASTE OBJECT

This application is a divisional application of application Ser. No. 09/584,079, filed Jun. 1, 2000, now U.S. Pat. No. 6,279,586, issued Aug. 28, 2001, which is a divisional application of application Ser. No. 09/311,281, filed May 14, 1999, now U.S. Pat. No. 6,209,554, issued Apr. 3, 2001.

BACKGROUND OF THE INVENTION 1. (Field of the Invention)

The present invention relates to a method of removing oil as implemented prior to the breaking or dismantling of industrial waste objects containing oil, such as compressors, engines, or the like, and to an apparatus for effecting the same.

2. (Description of the Related Art)

Conventionally, after an industrial waste object made from iron, plastic or a combination of these, etc. has been broken up using a breaking machine, or the like, it is recycled by separation and classification.

Since waste objects such as the compressors, engines, or the like contain oil, there is a danger of the oil catching fire and exploding if they are put directly into a breaking machine in this state. Thus, it has only been possible to break up such products by low-temperature breaking in an inert gas atmosphere, which entails expensive apparatus and running costs. In general, it has been common to use manual dismantling by fusing, which is inexpensive but dangerous.

However, the manual dismantling by fusing generates flames and involves the danger of fire or burns, the ambient atmosphere is degraded by production of smoke, and there are also limits on the processing capacity of the operator. Accordingly, it has been necessary previously to remove oil from waste objects in an efficient manner, in order that they can be processed safely using a breaking machine, or the like.

SUMMARY OF THE INVENTION

The present invention has been developed to overcome the above-described disadvantages.

It is accordingly an objective of the present invention to provide a method of and an apparatus for removing oil from industrial waste objects, whereby dismantling can be carried out safely without polluting the ambient environment, by removing oil efficiently from industrial products containing oil, prior to dismantling of the same in a breaking machine, or the like.

In accomplishing the above and other objectives, a method according to the present invention comprises the steps of: attaching an oil recovery vessel to a first opening provided in an upper portion of a waste object containing oil; injecting water into the waste object via a second opening positioned below the first opening, thereby causing water to accumulate inside the waste object and causing the oil inside the waste object to float upwards; and recovering the oil that floats upwards in the oil recovery vessel.

Hot water, cleaning solution or water at room temperature is preferably used as water to be injected into the waste object to reduce the viscosity of oil contained therein or soften oil adhering thereto.

Advantageously, the second opening is connected to a recovery tank, and after oil has been recovered in the oil recovery vessel, the oil and water lying above the second opening is recovered in the recovery tank.

Conveniently, at least one of the first and second openings is a through-hole formed in the waste object.

Another form of the present invention is a method comprising the steps of: connecting a recovery tank to a first opening provided in an upper portion of a waste object containing oil and to a second opening positioned below the first opening; injecting water of a predetermined temperature held in the recovery tank into the waste object via the second opening, thereby causing water to accumulate inside the waste object and causing the oil inside the waste object to float upwards; and recovering the oil that floats upwards in the recovery tank via the first opening.

Advantageously, after oil has been recovered in the recovery tank, the oil and water lying above the second opening is recovered in the recovery tank via the second opening.

Conveniently, the first opening is connected to a vacuum pump, and the inside of the waste object is reduced to low pressure before water is injected into the waste object.

Again conveniently, the first opening is connected to a compressed air source, and after oil has been recovered in the recovery tank, the oil and water lying above the second opening is recovered in the recovery tank by supplying compressed air to the inside of the waste object.

A further form of the present invention is a method comprising the steps of: connecting a heated fluid source and a recovery tank, respectively, to a first opening and a second opening provided in a waste object containing oil; causing the oil inside the waste object to flow out via the second opening, by supplying a heated fluid to the inside of the waste object via the first opening; and recovering the oil discharged from the second opening in the recovery tank.

It is preferred that steam be used as the heated fluid. In this case, condensate of steam supplied to the inside of the waste object is caused to accumulate inside the waste object.

Heated air may be used as the heated fluid. In this case, the second opening is provided at the lowest point of the waste object, and oil inside the waste object, which has been reduced in viscosity by the heated air, is recovered in the recovery tank under its own weight.

An apparatus according to the present invention includes a recovery tank connected to a first opening formed in an upper portion of a waste object and to a second opening positioned below the first opening, a first pipe connecting the first opening to the recovery tank via a first valve, a second pipe connecting the second opening to the recovery tank via a second valve, a pump provided in the second pipe, and a controller for controlling the first and second valves and the pump.

By this arrangement, when the second valve is opened and the pump is actuated, water of a predetermined temperature contained in the recovery tank is injected into the waste object via the second opening to accumulate inside the waste object, thereby causing the oil in the waste object to float upwards. Such oil is recovered in the recovery tank via the first opening by opening the first valve.

Advantageously, the apparatus further includes a third pipe connecting the second opening and the recovery tank via a third valve, wherein after oil has been recovered in the recovery tank, the oil and water lying above the second opening is recovered in the recovery tank by opening the third valve.

Again advantageously, the apparatus further includes a vacuum pump connected to the first opening via a fourth valve, wherein before injecting water into the waste object, the inside of the waste object is reduced to low pressure by opening the fourth valve.

The apparatus may include a compressed air source connected to the first opening via a fifth valve, wherein after the oil has been recovered in the recovery tank, the oil and water lying above the second opening is recovered in the recovery tank by opening the fifth valve to supply compressed air to the inside of the waste object.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on an application Ser. No. 10-215209 filed Jul. 30, 1998 in Japan, the content of which is incorporated hereinto by reference.

Figure 1:
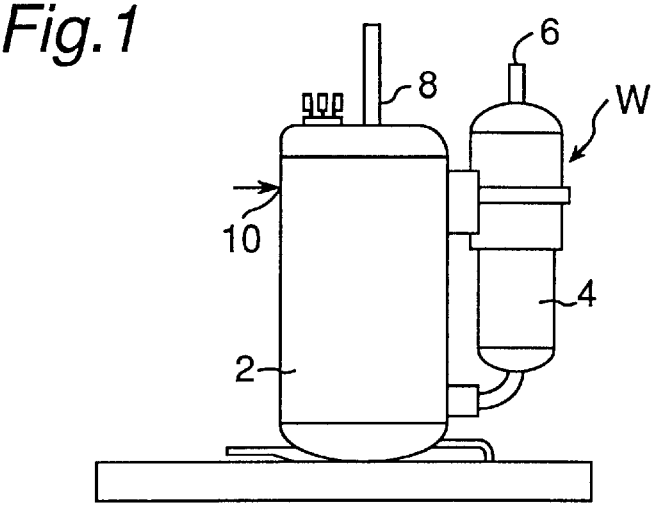
FIG. 1 is a front view of a sealed compressor used as a work unit example.

FIG. 1 shows a sealed compressor W forming an industrial waste object, which includes a sealed container 2 holding an electric motor and compressor elements, and a gas-liquid separator 4 juxtaposed with the sealed container 2. The gas-liquid container 4 is coupled to an inlet pipe 6, and the sealed container 2 is coupled to a discharge pipe 8. The sealed compressor W contains oil for lubricating the compressor elements during operation, and if the sealed compressor W were to be introduced into a breaking machine in this state, there is a danger that the oil would catch fire and explode.

The implementation of the method of removing oil according to the present invention is described below, using the sealed compressor W having the foregoing composition as a work unit example.

Embodiment 1

Figure 2:
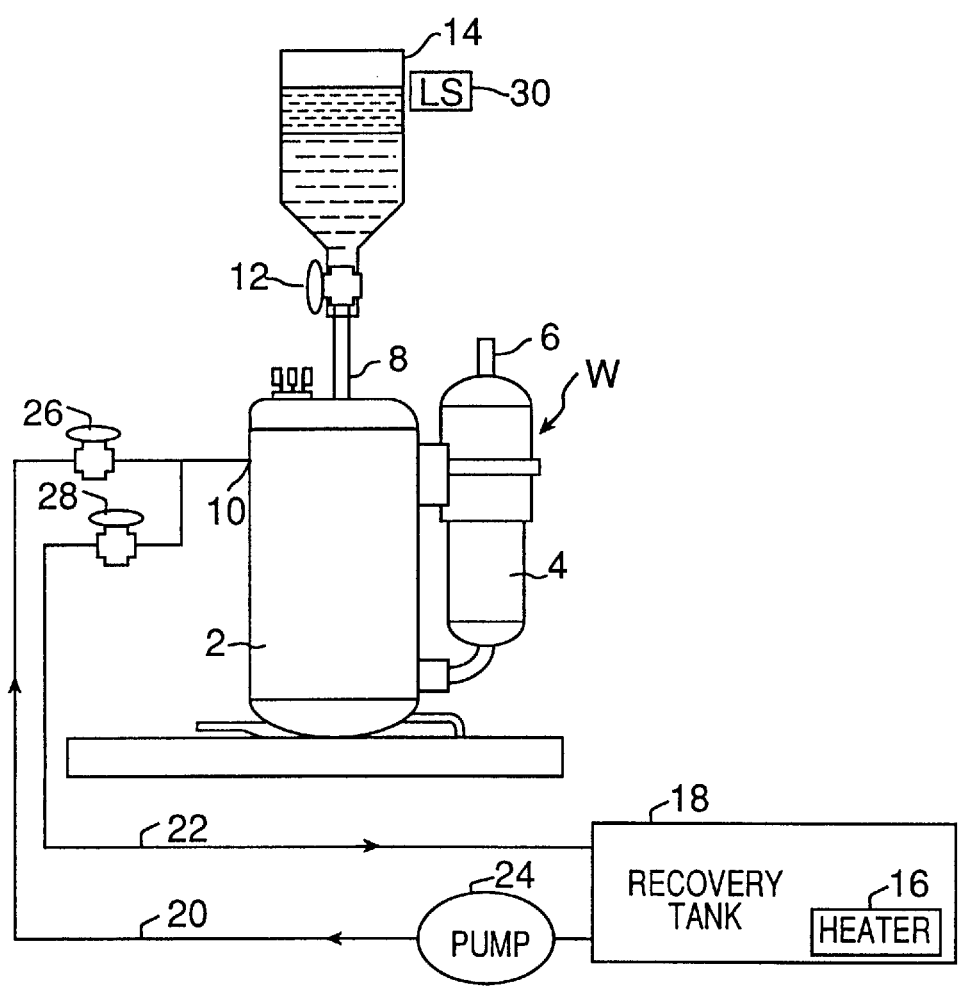
FIG. 2 is a piping system diagram of an oil removing apparatus according to a first embodiment of the present invention.
Figure 3:
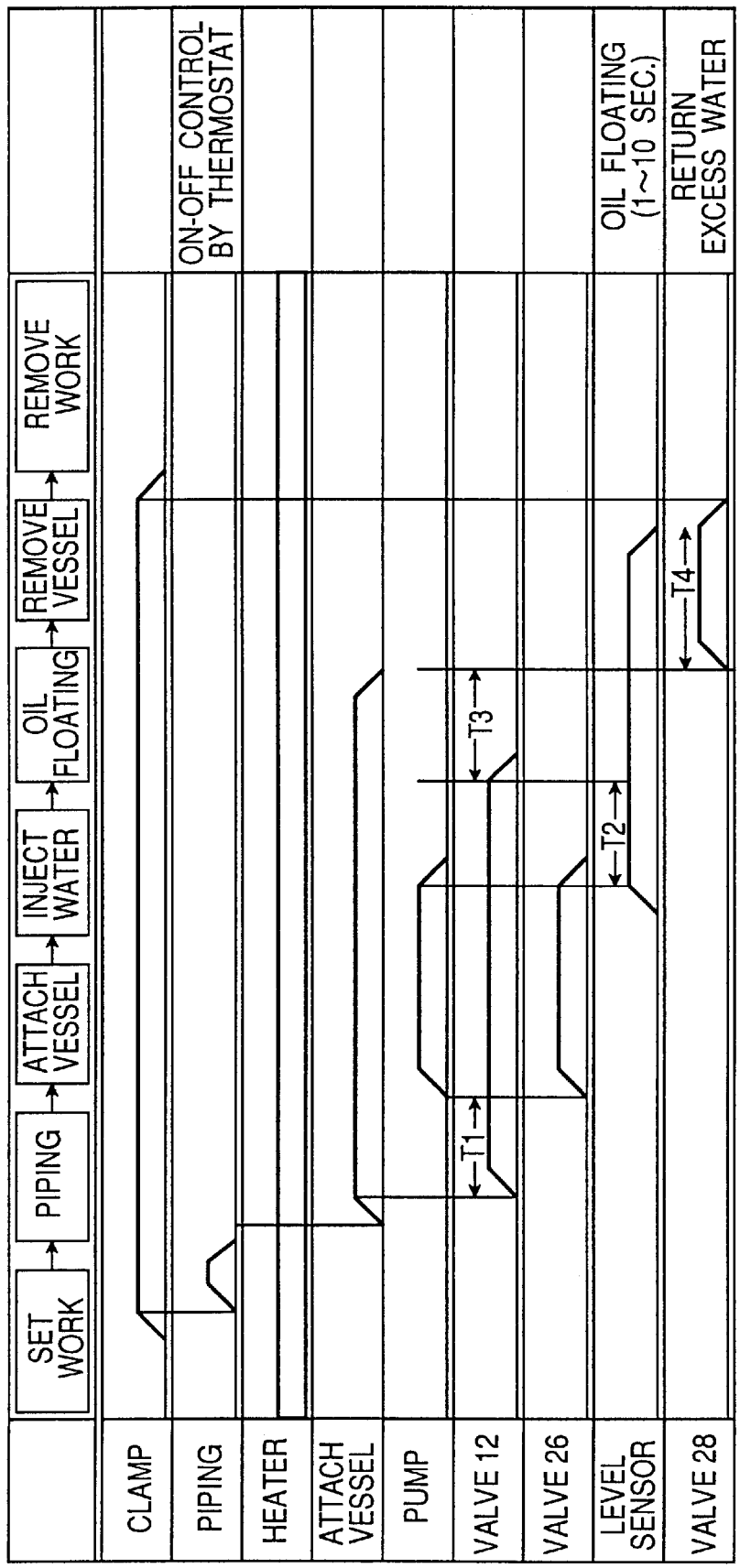
FIG. 3 is a timing chart of a case where oil removal is carried out using the oil removing apparatus of FIG. 2.

FIG. 2 shows an oil removing apparatus according to a first embodiment of the present invention, and FIG. 3 is a timing chart of a case where oil is removed.

As shown in FIG. 2 and FIG. 3, the work unit W is first set and clamped (fixed) in a predetermined position, and a through-hole 10 of ϕ 6–8, for example, is formed by drilling, punching, or the like, in an upper portion of a cylindrical shell forming the sealed container 2, which is a part of the work unit W. Thereupon, an oil recovery drum 14 having a valve 12 is connected to the discharge pipe 8, and an oil and hot water recovery tank 18 accommodating a heater 16 and positioned in the vicinity of the work unit W is connected via pipes 20, 22 to the through-hole 10 in the sealed container 2. A hot water pump 24 and a valve 26 are installed on the course of the pipe 20, while a valve 28 is installed on the course of the pipe 22. A level sensor 30 is attached to the oil recovery drum 14 for detecting the level of hot water or oil contained therein.

The heater 16 is already switched on prior to the formation of the through-hole 10 in the sealed container 2, and water previously stored in the oil and hot water recovery tank 18 is heated to a predetermined temperature by means of ON/OFF control by a thermostat (not shown).

In this state, an opening of the inlet pipe 6 is closed and the valve 12 is opened. After a predetermined time period T1 has passed, the valve 26 is opened and the hot water pump 24 is actuated, whereupon the hot water held at the predetermined temperature by the heater 16 passes from the oil and hot water recovery tank 18 to the sealed vessel 2. When the water has passed and it is detected by the level sensor 30 that the hot water or oil inside the oil recovery drum 14 has reached a predetermined level, the hot water pump 24 is halted and the valve 26 is closed.

If this state is maintained for a predetermined time period T2 (for example, 1 second–10 seconds), then practically all of the oil remaining in the sealed container 2 will be heated by the hot water and the viscosity thereof will fall (it will become more fluid), and hence the oil will gradually float upwards in the sealed container 2, being recovered in the oil recovery drum 14 and accumulating in the upper portion thereof.

After a predetermined time period T2 has elapsed, the valve 12 is closed, and the oil recovery drum 14 is separated from the sealed container 2, whilst the valve 28 is opened for a predetermined time period T4 such that the hot water located above the through-hole 10 and containing a quantity of oil is recovered in the oil and hot water recovery tank 18.

The oil inside the oil recovery drum 14 separated from the sealed container 2 is further separated into an oil component and water component by an oil/water separating device (not shown), via a recovery device (not shown). The separated oil component is further deaerated by a vacuum deaeration device, dust and moisture is separated therefrom, and it is then reused as lubricating oil, fuel oil, or the like.

The hot water in the upper portion of the through-hole 10 is recovered in the oil and hot water recovery tank 18. After the valve 28 is closed, the work unit W which is filled with water is removed and introduced into a breaking machine. Since almost all of the oil is removed from the work unit W and the work unit W is filled with water, temperature rise during breaking is suppressed and there is no danger of fire or explosion.

Embodiment 2

Figure 4:
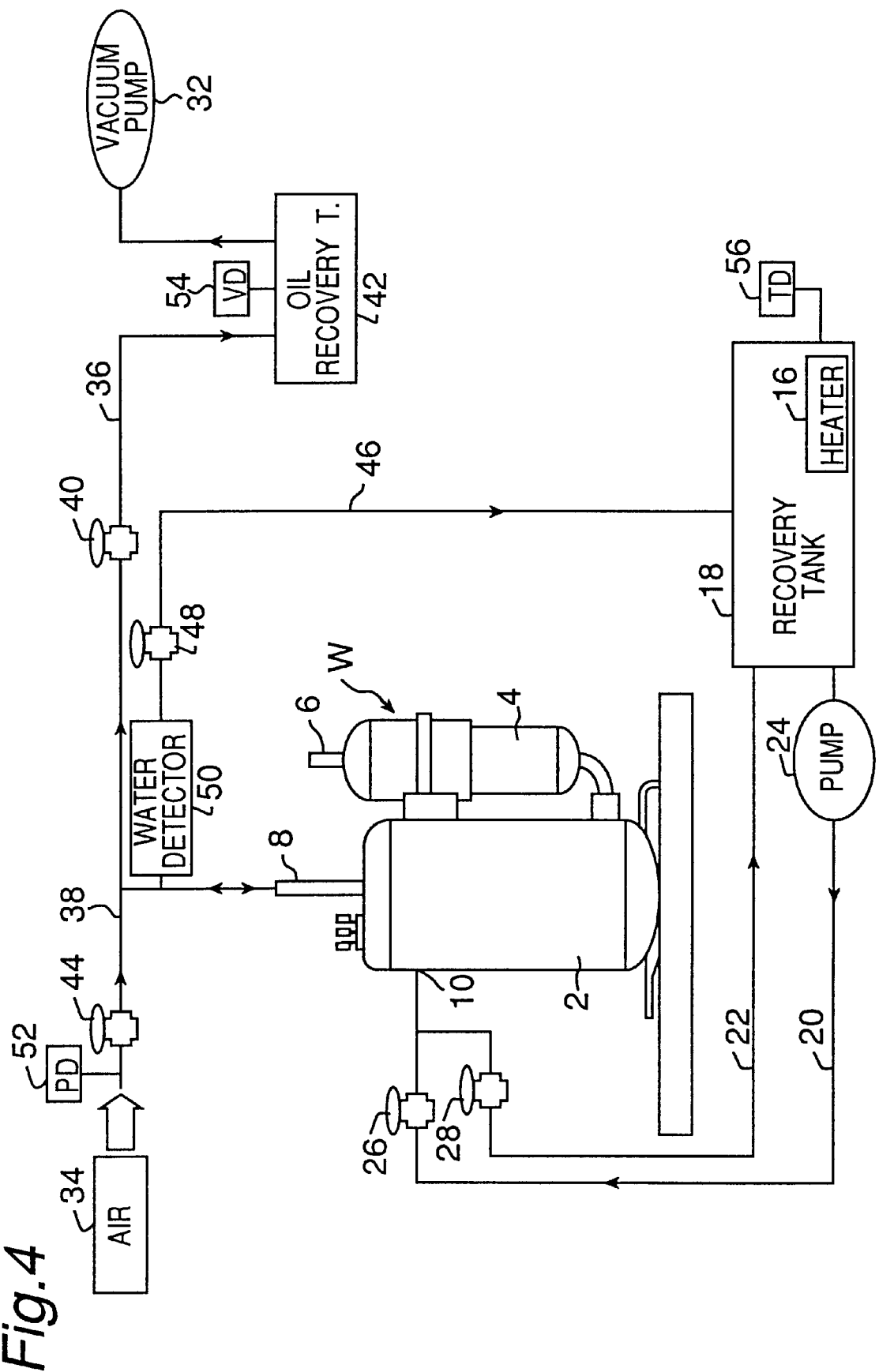
FIG. 4 is a diagram similar to FIG. 2, but according to a second embodiment of the present invention.

FIG. 4 shows an automated apparatus for extracting oil according to a second embodiment of the present invention.

In the oil extracting apparatus illustrated in FIG. 4, since the position in which the through-hole 10 is formed and the connection relationship between the work unit W and the oil and the hot water recovery tank 18 are the same as those in the oil extracting apparatus illustrated in FIG. 2, only the points of difference are described below.

A discharge pipe 8 attached to a sealed container 2 is connected respectively, via a pipe 36 and pipe 38, to a vacuum pump 32 and compressed air source 34. A valve 40 and an oil recovery tank 42 are installed on the course of the pipe 36, while a valve 44 is installed on the course of the pipe 38. The discharge pipe 8 is also connected via a pipe 46 to an oil and hot water recovery tank 18. A valve 48 is installed in the pipe 46, and a hot water detector 50, such as a reed switch, is installed between the valve 48 and discharge pipe 8.

In FIG. 4, numeral 52 is a compressed air pressure detector attached to the pipe 38, numeral 54 is a vacuum state detector attached to the oil recovery tank 42, and numeral 56 is a hot water temperature detector attached to the oil and hot water recovery tank 18.

Figure 5:
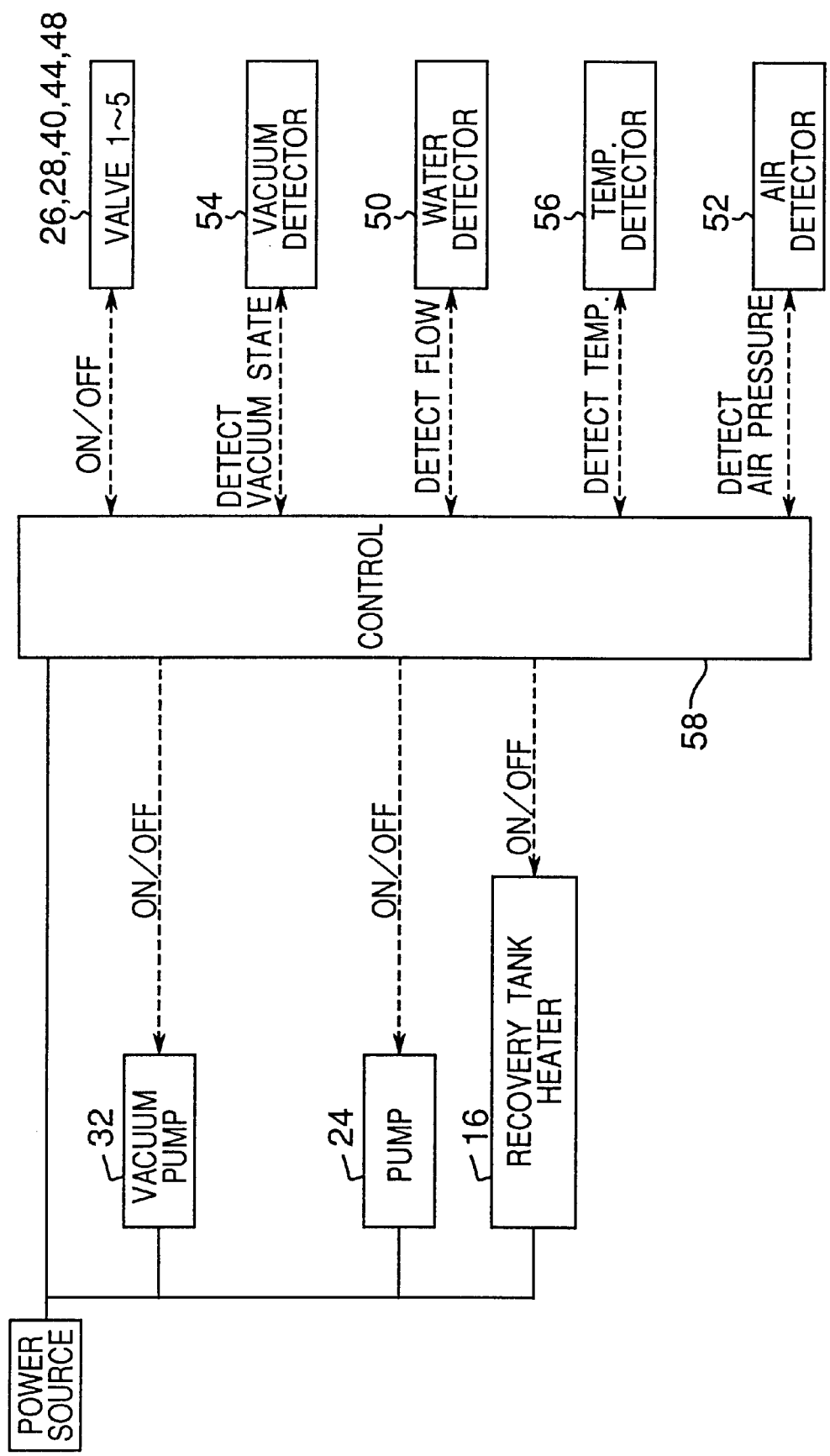
FIG. 5 is a block diagram illustrating the control of the oil removing apparatus of FIG. 4.

As shown in FIG. 5, a heater 16 provided in the oil and hot water recovery tank 18, a hot water pump 24, vacuum pump 32, valves 26, 28, 40, 44, 48 and various detectors 50, 52, 54, 56 are connected electrically to a controller 58, which performs various control operations.

Figure 6:
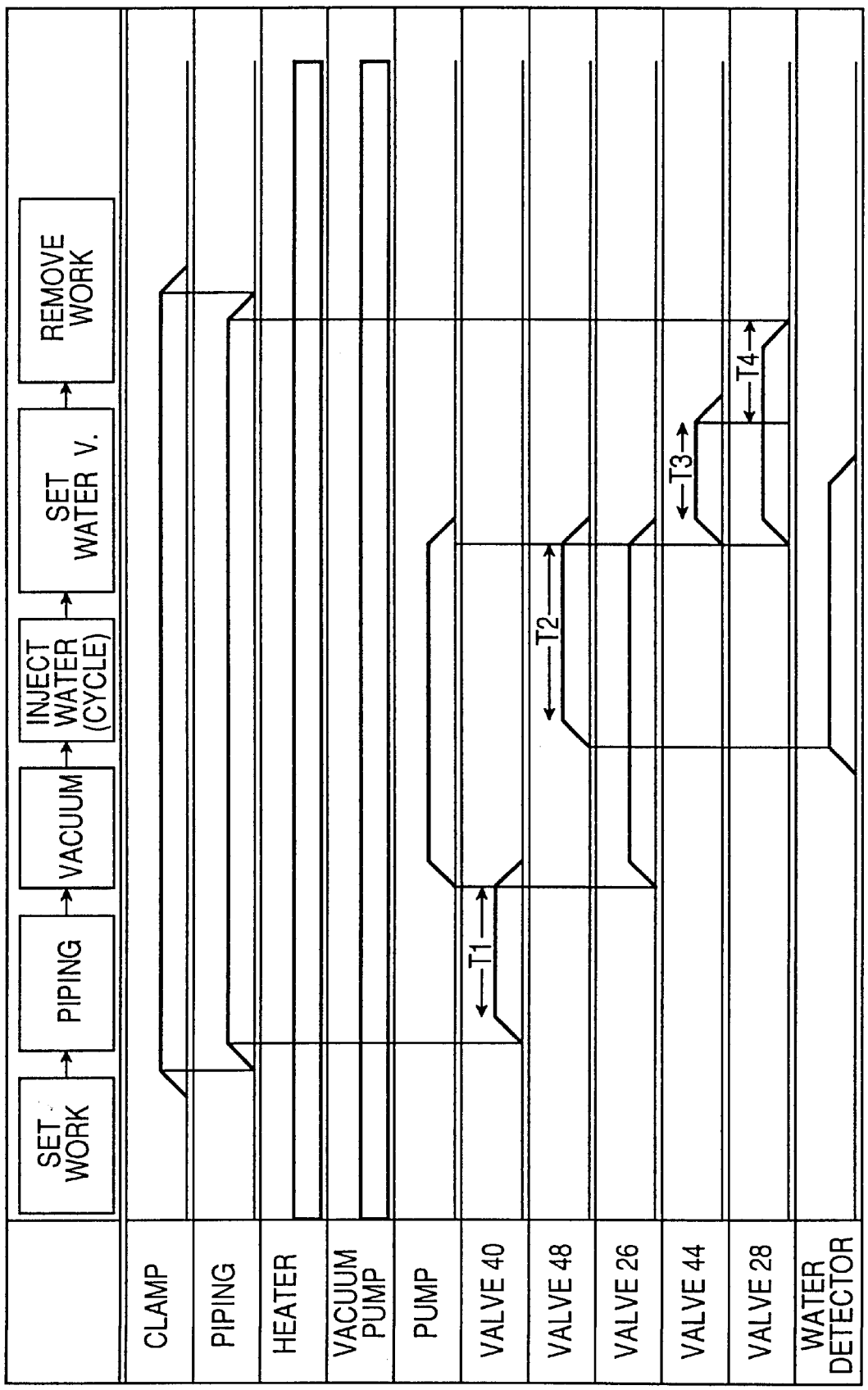
FIG. 6 is a timing chart of a case where oil removal is carried out using the oil removing apparatus of FIG. 4.

Next, the action of the oil removing device in FIG. 4 is described with reference to the timing chart illustrated in FIG. 6.

Similarly to the first embodiment, the work unit W is first set and clamped in a predetermined position, and a through-hole 10 of φ 6–8, for example, is made by drilling, punching, or the like, in the upper portion of the cylindrical shell forming the sealed container 2. Thereupon, the pipe 36 leading to the vacuum pump 32, the pipe 38 leading to the compressed air source 34, and the pipe 46 leading to the oil and hot water recovery tank 18 are connected to the discharge pipe 8. The oil and hot water recovery tank 18 is connected to the through-hole 10 in the sealed container 2 via pipes 20 and 22.

The heater 16 is already switched on prior to formation of the through-hole 10 in the sealed container 2, and the water inside the oil and hot water recovery tank 18 is heated by the heater 16 and the temperature thereof is detected by a hot water temperature detector 56. A signal indicating the detected temperature is transmitted to the controller 58 and the water in the oil and hot water recovery tank 18 is held at a predetermined temperature (for example, 50–65° C.) by means of the controller 58 performing ON/OFF control of the heater 16 on the basis of the temperature signal.

On the other hand, the oil recovery tank 42 is reduced to a vacuum by the vacuum pump 32, and when the vacuum state detector 54 detects a predetermined vacuum state after the pipe connections to the work unit W have been established, it transmits a signal to this effect to the controller 58, which causes the valve 40 to open.

After a predetermined time period T1 (for example, several seconds,) has elapsed, the valve 40 is closed, and simultaneously with this, the hot water pump 24 is activated and the valve 26 is opened. Thereupon, since the work unit W is in a reduced pressure state, hot water supplied from the oil and hot water recovery tank 18 by means of the hot water pump 24 accumulates rapidly inside the work unit W. When hot water accumulates inside the work unit W, the viscosity of the oil remaining inside the work unit W is reduced by the hot water, and this oil gradually floats upward. When the hot water detector 50 confirms that hot water or oil is overflowing from the work unit W, it transmits a signal to this effect to the controller 58, which causes the valve 48 to open.

When the valve 48 is opened, the oil which has been reduced in viscosity and has become more fluid is recovered in the oil and hot water recovery tank 18 via the valve 48. When a predetermined time period T2 (for example, several seconds) has elapsed after opening the valve 48, both the valve 48 and valve 26 are closed, and the hot water pump 24 is halted. In this state, if the compressed air pressure as detected by the compressed air pressure detector 52 is above a predetermined value (for example, 3.5 kg/cm$^2$), then the detector 52 sends a signal to this effect to the controller 58, which causes the valve 44 and valve 28 to open. Consequently, the hot water containing oil accumulated in the portion of the work unit above the through-hole 10 is recovered rapidly in the oil and hot water recovery tank 18 via the valve 28 under the pressure of the compressed air supplied via the valve 44. Once the valve 44 has been opened for a predetermined time period T3, it is closed and after a further predetermined time period T4 has elapsed, the valve 28 is closed.

Thereupon, the work unit W containing water in the portion thereof below the through-hole 10 is detached and introduced into a breaking machine.

Similarly to the first embodiment, the oil recovered in the oil and hot water recovery tank 18 is further separated into an oil component and water component by an oil-water separating device, via a recovery device. The separated oil component is further deaerated by means of a vacuum deaeration device, and dirt and moisture are removed, whereupon it is reused.

In the embodiment described above, the vacuum pump 32, compressed air source 34, and associated piping are not specifically necessary, and these elements may be omitted.

Moreover, in this embodiment and the first embodiment, hot water was used as the recycling water, but it is also possible to use a cleaning solution containing a cleaning agent at a predetermined temperature. If the ambient temperature is high, then the cleaning solution or water at room temperature may be used directly without heating.

Moreover, the position of the through-hole 10 was set in the upper portion of the cylindrical shell forming the sealed container 2, but the through-hole may also be provided in another position, provided that this position allows a certain amount of water to accumulate inside the sealed container 2. It is also possible to provide two or more through-holes in the sealed container 2, sealing off the discharge pipe 8 and connecting the pipes 20, 22, 36, 38, 46 independently. Furthermore, rather than providing any through-holes, it is also possible to utilize the openings of the inlet pipe 6 and the discharge pipe 8.

Embodiment 3

Figure 7:
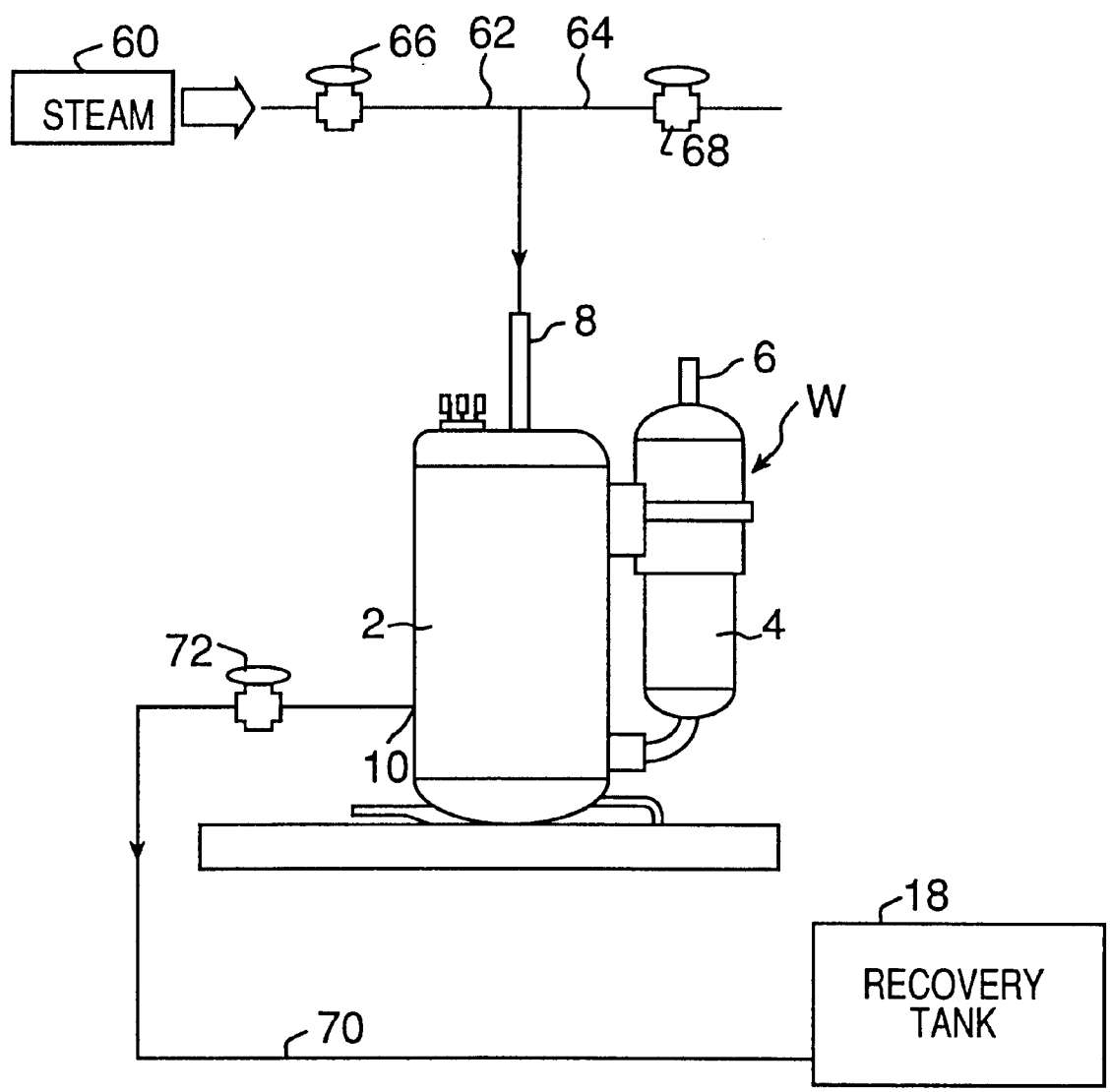
FIG. 7 is a diagram similar to FIG. 2, but according to a third embodiment of the present invention.
Figure 8:
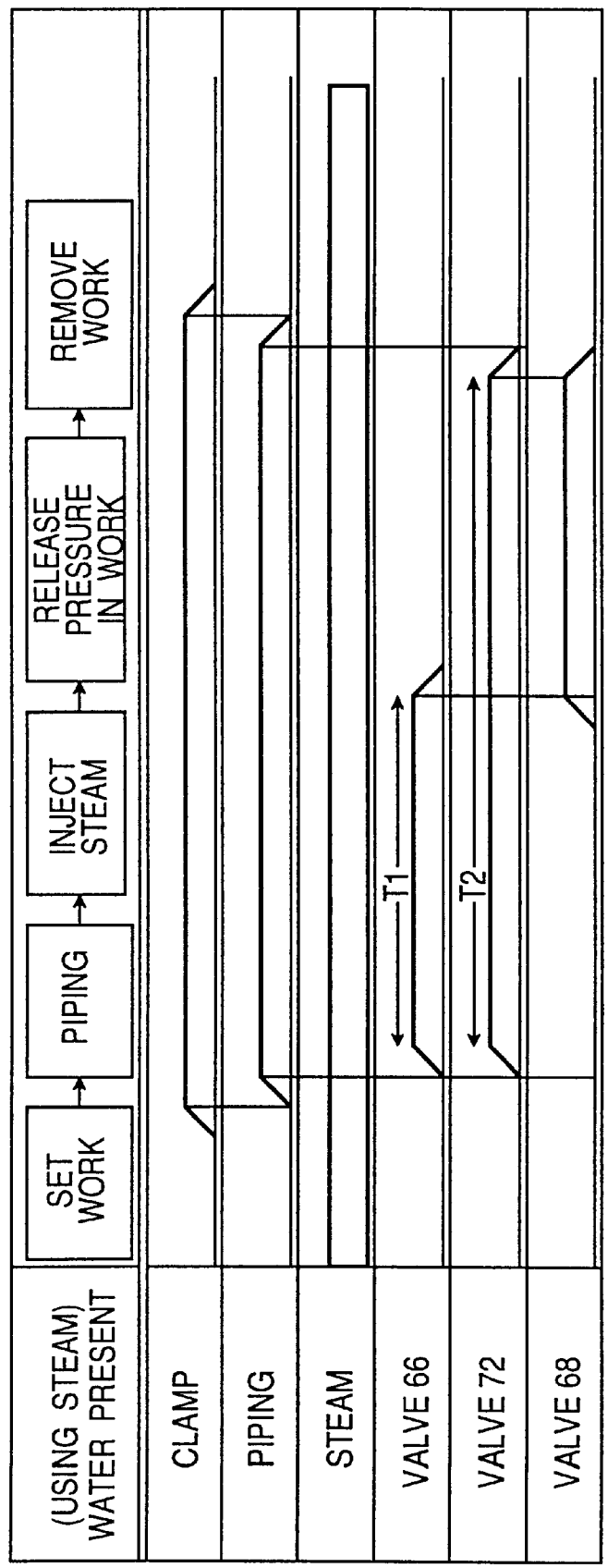
FIG. 8 is a timing chart of a case where oil removal is carried out using the oil removing apparatus of FIG. 7.

FIG. 7 shows an oil removing apparatus according to a third embodiment of the present invention, and FIG. 8 is a timing chart of an oil removing process.

As illustrated in FIG. 7 and FIG. 8, a work unit W is first set and clamped in a predetermined position, and a through-hole 10 of φ 6–8 is formed by drilling, punching, or the like, in a lower portion of the cylindrical shell, which forms a part of the work unit W. Thereupon, a steam supply source 60 is connected via a pipe 62 to a discharge pipe 8, and a pipe 64 forms a branching junction along the course of pipe 62. A valve 66 is attached to the pipe 62 and a valve 68 connected to the air is attached to the pipe 64.

On the other hand, an oil and hot water recovery tank 18 provided in the vicinity of the work unit W is connected to the through-hole 10 in the sealed container 2 via a pipe 70. The opening of the inlet pipe 6 is sealed off.

In this state, if steam is supplied into the work unit W from the steam supply source 60 by opening the valve 66, whilst also opening valve 72, then the oil remaining inside the work unit W will be heated by the steam, the viscosity thereof will fall, and the oil will accumulate in a bottom portion of the work unit W. When the valve 66 has been held open for a predetermined time period T1, a portion of the steam will condense, forming hot water, which accumulates in the lower portion of the work unit W with the oil. Consequently, the oil floats to the top fo the hot water, and is recovered in the oil and hot water recovery tank 18 via the pipe 70.

When a predetermined time period T1 has elapsed, the valve 66 is closed and the valve 68 is opened, thereby allowing the oil to continue to be recovered in the oil and hot water tank 18, whilst releasing the pressure inside the work unit W externally, via the valve 68. When the valve 72 has been opened for a predetermined time period T2, it is closed along with the valve 68.

The pipes 62, 64 are then detached from the discharge pipe 8 and the pipe 70 is removed from the through-hole 10, whereupon the work unit W is introduced into a breaking machine.

The subsequent processing of the oil recovered from the oil and hot water recovery tank 18 is similar to that in the first and second embodiments, and hence description thereof is omitted here. Moreover, it is also possible to provide two or more through-holes in the sealed container 2, the discharge pipe 8 being sealed off and the pipes 62, 64 and 70 being connected independently. Moreover, rather than providing any through-holes, it is also possible to utilize the openings of the inlet pipe 6 and the discharge pipe 8. Furthermore, instead of steam, pressurized hot water or cleaning solution may be used, and if the ambient temperature is high, pressurized water at room temperature may be used.

In the present embodiment, since the work unit W contains accumulated water when it is introduced into a breaking machine, there is little temperature rise during breaking, and since the oil content thereof is small, there is little danger of fire or explosion.

Embodiment 4

Figure 9:
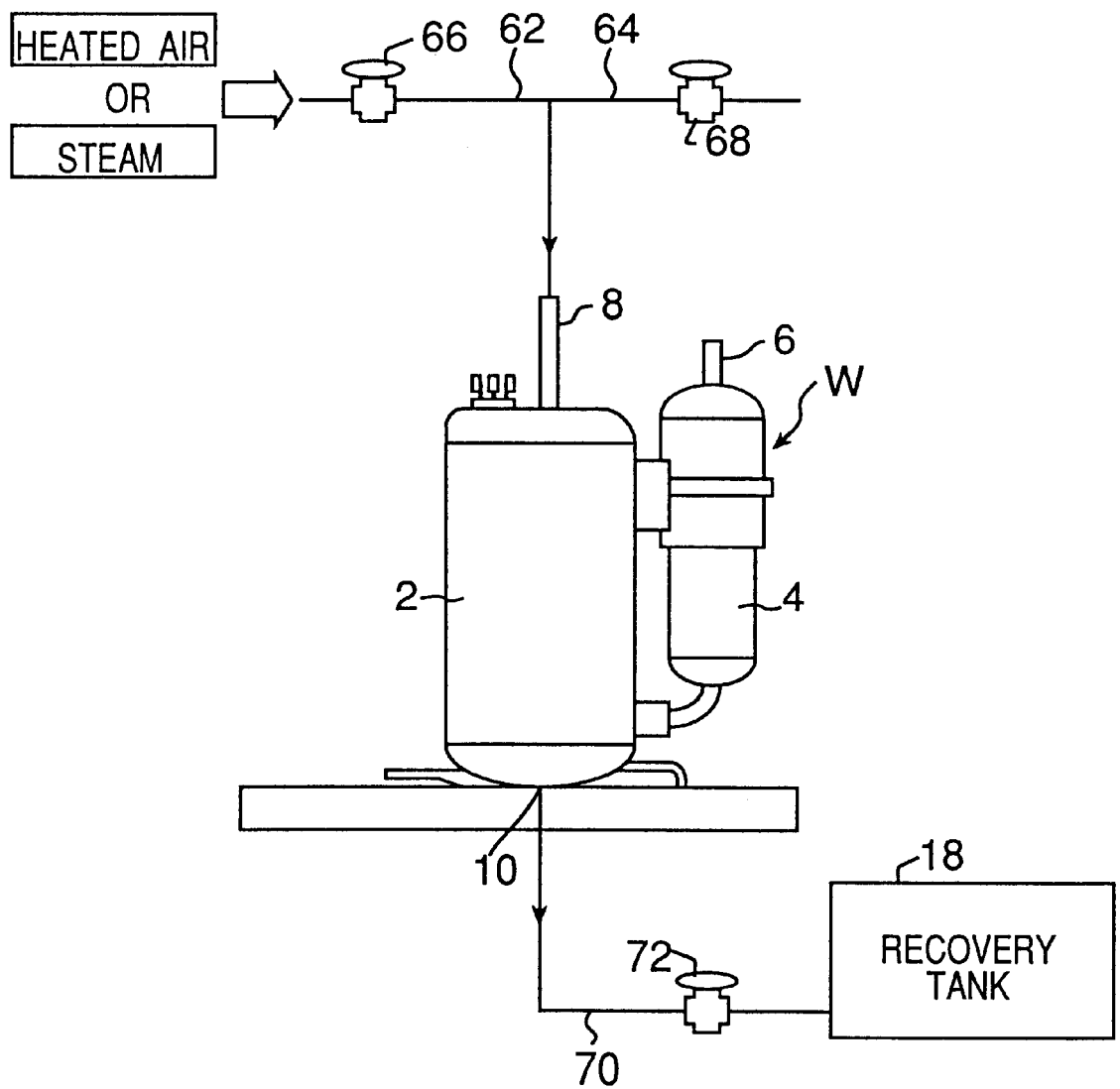
FIG. 9 is a diagram similar to FIG. 2, but according to a fourth embodiment of the present invention.
Figure 10:
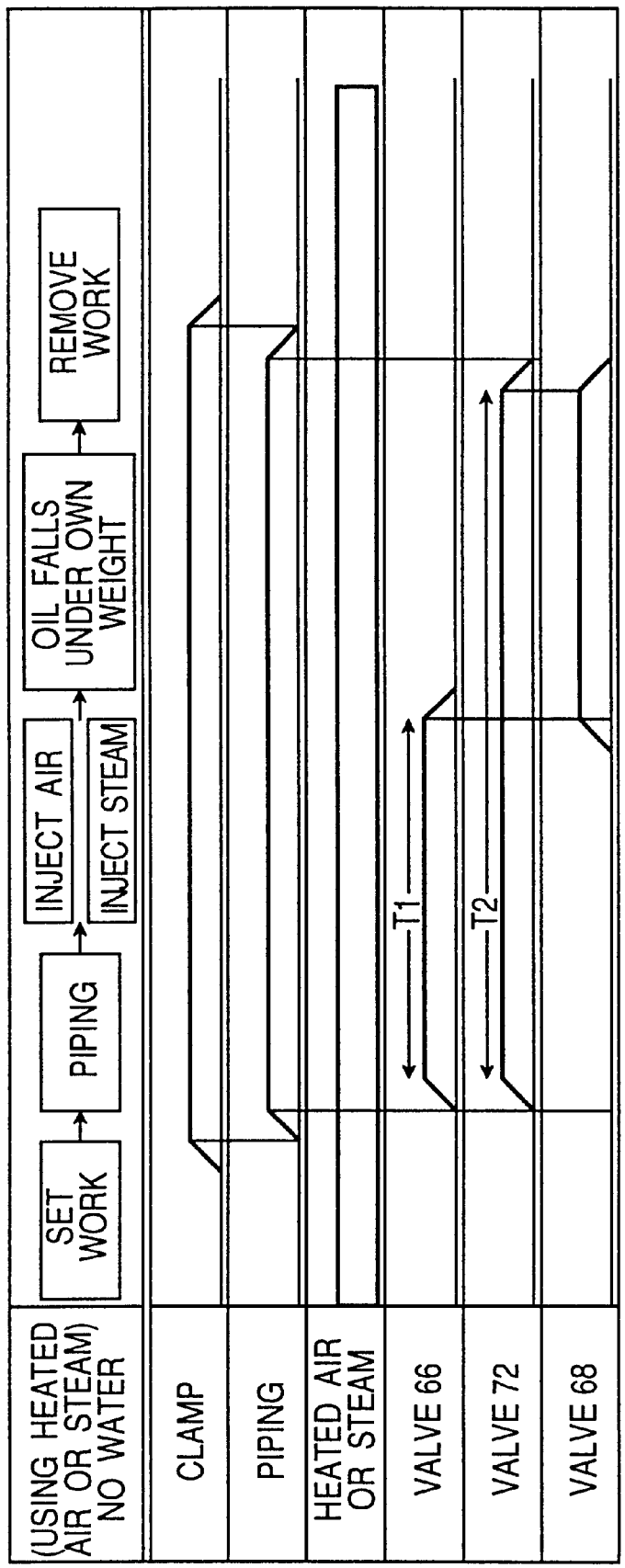
FIG. 10 is a timing chart of a case where oil removal is carried out using the oil removing apparatus of FIG. 9.

FIG. 9 shows an oil removing apparatus according to a fourth embodiment of the present invention, and FIG. 10 is a timing chart of an oil removing process.

This embodiment is similar to the third embodiment, but differs therefrom in that heated air or steam is used as a medium to be supplied to the work unit W and in that a through-hole 10 is formed in the center of the lower part of the shell (lowest point).

Therefore, in the present embodiment, there is no accumulation of water in the work unit W and the oil is recovered in the oil and hot water recovery tank 18 under its own weight. The further composition and action of this embodiment is the same as the third embodiment, and hence description thereof is omitted here. Moreover, instead of heated air or steam, it is possible to use pressurized hot water or cleaning solution. If the ambient temperature is high, then pressurized water at room temperature may be used. It is also possible to provide two or more through-holes in the sealed container 2, the discharge pipe 8 being sealed off and the pipes 62, 64 and 70 being connected independently.

The first to fourth embodiments described above relate to a case where a sealed compressor is used as the work unit W, but the present invention can of course be applied to other sealed objects containing oil, such as engines, or the like.

Being constituted as described above, the present invention has the following merits.

According to the first aspect of the present invention, water is caused to accumulate inside the waste object by injecting water via a second opening positioned below the first opening, and the oil that floats upwards is recovered in an oil recovery vessel via the first opening. Accordingly, the oil is gathered reliably into the oil recovery vessel, the oil becoming separated from the water due to the difference in specific gravity, and hence oil can be recovered with good efficiency.

Moreover, since a second opening is connected to the recovery tank, and after the oil has been recovered, the oil and water lying above the second opening is recovered in the recovery tank, virtually no oil remains in the waste object prior to dismantling. Thus, the waste object can be dismantled safely.

Furthermore, since a through-hole formed in the waste object is used for at least one of the first and second openings, it is possible to set the amount of water accumulating inside the waste object according to the position in which the through-hole is formed, and hence temperature rise during dismantling of the waste object can be suppressed appropriately.

Also, since water is caused to accumulate inside the waste object by injecting the water in the recovery tank via the second opening, whilst the oil that has floated upwards is recovered in the recovery tank via the first opening, it is possible to effectively recover oil that has been separated from the water due to the specific gravity difference, without ambient dispersal of oil.

Moreover, since the inside of the waste object is reduced to a low pressure before injecting water into the waste object, water accumulates rapidly therein and oil recovery can be carried out with good efficiency.

Also, after oil has been recovered, the oil and water lying above the second opening is recovered rapidly in the recovery tank by supplying compressed air to the inside of the waste object. It is, therefore, possible to raise the efficiency of oil recovery and increase the safety of dismantling.

If a heated fluid is supplied to the inside of the waste object via the first opening to reduce the adhesion of the oil inside the waste object and to make the oil more fluid, it is possible to recover oil reliably, without contaminating the ambient atmosphere, using a simple composition.

Furthermore, since steam is used as a heated fluid and water condensed from the steam supplied to the waste object accumulates inside the waste object, it is possible to suppress temperature rise during dismantling of the waste object.

The oil inside the waste object can be recovered in the recovery tank under its own weight by reducing the viscosity thereof using heated air. In this case, oil recovery can be effectively carried out in an extremely simple manner.

In the oil recovering apparatus according to the present invention, when a second valve is opened and a pump is actuated, water in a recovery tank is caused to accumulate inside the waste object via a second opening and to float upwards. When a first valve is opened, the oil that has floated upwards is recovered in the recovery tank via a first opening. Accordingly, it is possible to recover oil which has been separated from water by means of their difference in specific gravity, efficiently, without oil being dispersed into the ambient environment.

Furthermore, since the oil and water lying above the second opening is recovered in the recovery tank by opening a third valve, after oil has been recovered, virtually no oil remains in the waste object before dismantling. It is, therefore, possible to dismantle the waste object safely.

Moreover, since the internal pressure of the waste object is reduced by opening a fourth valve before causing water to accumulate inside the waste object, it is possible to fill water into the waste object rapidly, and hence oil recovery can be carried out efficiently.

Also, after oil has been recovered, the oil and water lying above the second opening is recovered rapidly by supplying compressed air to the inside of the waste object by opening a fifth valve. Accordingly, it is possible to achieve good efficiency of oil recovery and safe dismantling of the waste object.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of removing oil from a waste object, comprising the steps of:
    connecting a heated fluid source to one of a first opening and a second opening provided in a waste object containing oil, said second opening being positioned below said first opening;
    connecting a recovery tank to the other of said first opening and said second opening in the waste object;
    injecting a fluid medium from the heated fluid source into the waste object via said one of the first and second openings, thereby reducing the viscosity of the oil in the waste object; and
    recovering the oil discharged from the other of the first and second openings in the recovery tank.

2. The method according to claim 1, wherein the heated fluid source is the recovery tank, and the fluid medium is heated water contained in the recovery tank.

3. The method according to claim 1, wherein the fluid medium is steam from a steam supply source.

4. The method according to claim 1, wherein the fluid medium is heated air from a heated air source.

* * * * *